(12) United States Patent
Severin et al.

(10) Patent No.: US 10,494,204 B2
(45) Date of Patent: Dec. 3, 2019

(54) TILTING DEVICE AND METHOD FOR OPERATING A TILTING DEVICE

(71) Applicants: ThyssenKrupp Industrial Solutions AG, Essen (DE); thyssenkrupp AG, Essen (DE)

(72) Inventors: Frank Severin, Blieskastel (DE); Frank Roth, Kleinblittersdorf (DE)

(73) Assignees: THYSSENKRUPP INDUSTRIAL SOLUTIONS AG, Essen (DE); THYSSENKRUPP AG, Essen (DE)

(*) Notice: Subject to any disclaimer, the term of this patent is extended or adjusted under 35 U.S.C. 154(b) by 0 days.

(21) Appl. No.: 15/544,406

(22) PCT Filed: Jan. 14, 2016

(86) PCT No.: PCT/EP2016/050598
§ 371 (c)(1),
(2) Date: Jul. 18, 2017

(87) PCT Pub. No.: WO2016/116339
PCT Pub. Date: Jul. 28, 2016

(65) Prior Publication Data
US 2018/0002121 A1   Jan. 4, 2018

(30) Foreign Application Priority Data
Jan. 23, 2015  (DE) .................. 10 2015 000 667

(51) Int. Cl.
*B65G 67/50*   (2006.01)

(52) U.S. Cl.
CPC ........ *B65G 67/50* (2013.01); *B65G 2814/037* (2013.01); *B65G 2814/0362* (2013.01)

(58) Field of Classification Search
CPC ........ B65G 67/42; B65G 67/50; B65G 67/54; B65G 2814/0362; B65G 2814/037
USPC .................. 414/360, 361, 372, 581, 766
See application file for complete search history.

(56) References Cited

U.S. PATENT DOCUMENTS

| | | | |
|---|---|---|---|
| 2,634,006 A * | 4/1953 | Criner .................. | B65G 67/00 414/361 |
| 3,719,292 A | 3/1973 | Ouska | |

(Continued)

FOREIGN PATENT DOCUMENTS

| | | |
|---|---|---|
| DE | 1117047 B | 11/1961 |
| DE | 1230360 A | 12/1966 |

(Continued)

OTHER PUBLICATIONS

English machine translation of International Search Report issued for PCT/EP2016/050598, dated Apr. 11, 2016 (dated Apr. 18, 2016).

(Continued)

*Primary Examiner* — James Keenan
(74) *Attorney, Agent, or Firm* — thyssenkrupp North America, Inc.

(57) ABSTRACT

A tilting apparatus for emptying materials, including bulk material, out of railcars that are open at a top may include a tilting frame that is rotatable about an axis of rotation D and is connected to a platform that can receive at least one railcar, a clamping arm attached to the tilting frame in a rotatable manner, a locking device for preventing relative movement of the tilting frame and the clamping arm, and a bracket that is attached to the clamping arm such that in a tilted position of the tilting apparatus in which the tilting frame has been rotated about the axis of rotation that bracket lies at least partially against an upper edge of at least one of the side walls of the at least one railcar. Further, the hydraulic cylinder may be attached to the bracket.

14 Claims, 5 Drawing Sheets

(56) References Cited

U.S. PATENT DOCUMENTS

| | | | | |
|---|---|---|---|---|
| 3,760,961 A | * | 9/1973 | Haditsch | B65G 67/00 414/361 |
| 3,777,914 A | * | 12/1973 | Cheek | B65G 67/00 414/360 |
| 3,811,580 A | | 5/1974 | Sheppard | |
| 4,134,503 A | * | 1/1979 | Baker | B65G 67/46 414/372 |
| 4,685,851 A | | 8/1987 | Dowden | |
| 4,690,603 A | * | 9/1987 | Graner | B65G 67/46 414/372 |
| 5,017,077 A | * | 5/1991 | Dowden | B65G 67/50 414/360 |
| 5,046,912 A | * | 9/1991 | Bostrom | B65G 67/50 414/358 |

FOREIGN PATENT DOCUMENTS

| | | | | |
|---|---|---|---|---|
| DE | 102006044976 B | | 5/2008 | |
| DE | 102008047716 B | | 4/2010 | |
| DE | 102010022384 A | | 12/2011 | |
| EP | 0 145 385 A2 | | 6/1985 | |
| GB | 548894 A | * | 10/1942 | B65G 67/00 |
| GB | 1271687 A | * | 4/1972 | B65G 67/00 |
| GB | 1564205 A | | 4/1980 | |

OTHER PUBLICATIONS

English abstract for DE102010022384A.
English machine translation for DE1117047B.
English machine translation for DE1230360A.

\* cited by examiner

TILTING DEVICE AND METHOD FOR OPERATING A TILTING DEVICE

CROSS REFERENCE TO RELATED APPLICATIONS

This application is a U.S. National Stage Entry of International Patent Application Serial Number PCT/EP2016/050598, filed Jan. 14, 2016, which claims priority to German Patent Application No. DE 10 2015 000 667.3 filed Jan. 23, 2015, the entire contents of both of which are incorporated herein by reference.

FIELD

The present disclosure generally relates to tilting apparatuses and methods for emptying materials, including tilting apparatuses and methods for emptying bulk material out of railcars that are open on top.

BACKGROUND

The invention relates to a tilting apparatus for emptying materials, preferably bulk material, out of railcars that are open at the top, and to a method for operating a tilting apparatus.

PRIOR ART

Tilting apparatuses are usually used for emptying railcars, in particular rail railcars, loaded with bulk material. In DE 10 2008 047 716, in order to be emptied, the railcars are clamped in the tilting apparatus and rotated through about 130°-180° about an axis of rotation, such that the railcar contents are tipped for example into a bunker. The railcar usually comprises a truck with a railcar spring and stands on a platform of the tilting apparatus during the tilting operation.

After the railcar has been emptied, it is rotated about the axis of rotation into the starting position, wherein the railcar comprises a weight reduced by the weight of the railcar contents. The difference in weight causes tension in the tilting apparatus, said tension being applied via the railcar spring, resulting in particular in a high degree of wear or in breakage of components of the tilting apparatus.

DETAILED DESCRIPTION

Figure 1:
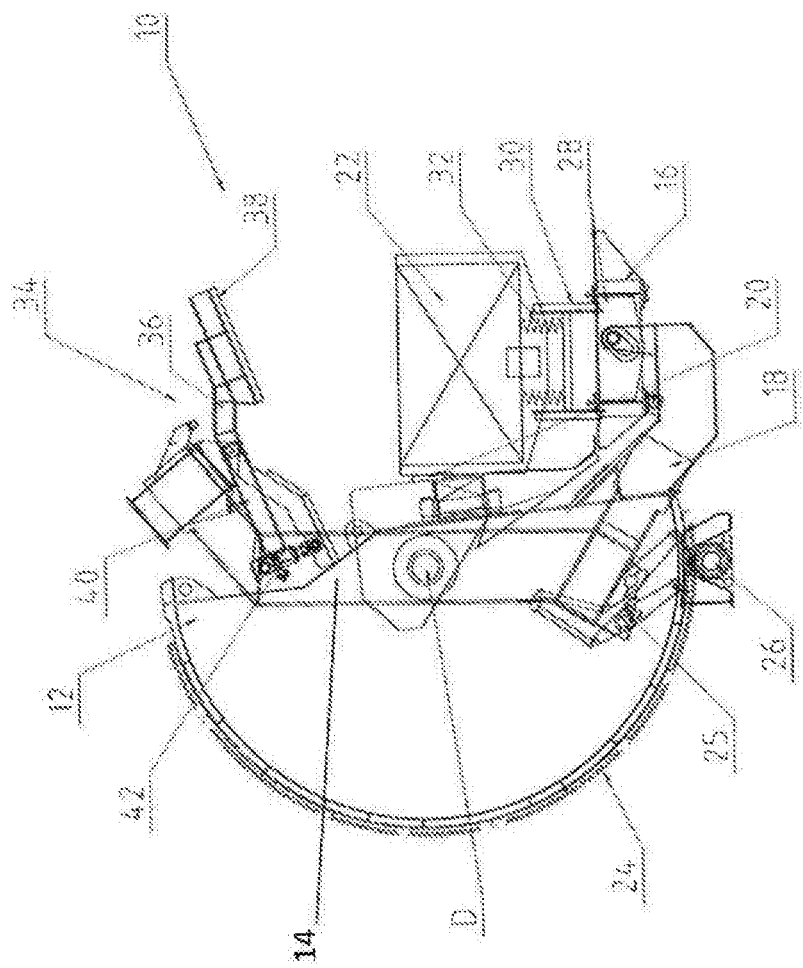
FIG. 1 is a schematic view of an example tilting apparatus having a railcar in a starting position.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting 'a' element or 'an' element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

Proceeding therefrom, it is the object of the present invention to provide a tilting apparatus and a method for operating a tilting apparatus, wherein tensions within the tilting apparatus are reliably minimized.

According to a first aspect, a tilting apparatus for emptying materials, preferably bulk material, out of railcars, in particular railcars that are open at the top, comprises a tilting frame which is rotatable about an axis of rotation, a platform, connected to the tilting frame, for receiving at least one railcar, a clamping arm attached to the tilting frame in a rotatable manner, a locking device for preventing a relative movement between the tilting frame and the clamping arm, and a bracket which is attached to the clamping arm such that, in a tilted position of the tilting apparatus, in which the tilting frame has been rotated about the axis of rotation, it lies at least partially against an upper edge of at least one side wall of the railcar, wherein a hydraulic cylinder is attached to the bracket such that it at least partially compensates for tensions in the tilting apparatus, in particular in the locking device, that arise during a tilting operation.

The tilting apparatus is preferably a side dump railcar, wherein the axis of rotation of the tilting frame is the central axis of the railcar, or a side discharge dumper, in which the axis of rotation of the tilting frame is located above the central axis of a railcar located in the tilting apparatus. The bulk material comprises for example raw materials, such as coal or ores. The railcar is for example a railcar of a freight train which is open at the top or at least can be opened at the top, such that bulk material located in the railcar can be tipped out by rotation of the railcar. The railcar preferably comprises a truck with railcar springs.

The tilting apparatus is preferably movable from a starting position, in which the surface of the platform is oriented substantially horizontally such that it is possible to move the railcar into the tilting apparatus or out of the tilting apparatus, into a tilted position, in which the tilting frame has been rotated through a rotation angle about the axis of rotation. The tilted position should be understood as being any position in which the tilting frame has been rotated about the axis of rotation relative to the starting position. A rotation in the tilting direction should be understood as being a rotation from the starting position into the end position of the tilting operation, in which the tilting frame has been rotated through about 130°-180°.

The tilting frame preferably comprises a drive ring which is configured in a substantially semicircular manner and comprises a toothed profile. The drive ring is engaged with a drive device such that, when the tilting apparatus is driven, the tilting frame rotates about the axis of rotation and the drive ring executes a substantially circular movement. The diameter of the substantially semicircular tilting frame exceeds the height of the railcar such that material is able to be tipped out of the latter by a rotary movement.

Preferably attached to the surface of the platform are rails on which the railcar is guidable into the tilting apparatus.

The platform is attached directly or via a connecting arm to the tilting frame so as to rotate therewith, such that the platform executes the rotary movement of the tilting frame.

The clamping arm extends in the direction of the axis of rotation of the tilting frame along at least one railcar length, such that at least one railcar, preferably two railcars, are receivable in the tilting apparatus. The rotatable attachment of the clamping arm to the tilting frame allows a relative movement of the tilting frame with respect to the clamping arm. The upper region of the clamping arm extends at an angle to the lower region of the clamping arm, such that, when the tilting frame rotates in the tilting direction, the upper region of the clamping arm and the platform move toward one another, such that the railcar is able to be fixed between the tilting frame and the clamping arm. Furthermore, the clamping frame preferably comprises a counterweight, which is attached to the clamping arm such that it ensures a vertical orientation of the lower region of the clamping arm in the starting position.

The bracket, which is attached in particular to the upper region of the clamping arm, between the clamping arm and platform, comes to lie against the upper edge of the side walls of the railcar when the clamping arm is rotated in the tilting direction. The bracket is preferably attached to the clamping arm in a movable, in particular rotatable, manner, such that it ensures that railcars of different heights and widths are fixed optimally in the tilting device.

In a locking position, the locking device prevents a relative movement of the tilting frame and of the clamping arm. Such a locking device is for example a bolt or a latching lock which is configured for example such that it prevents a relative movement of the clamping arm and of the tilting frame in one direction, in particular counter to the tilting direction.

During a tilting operation, the tilting frame is rotated in a tilting direction such that the space between the bracket and the platform reduces until the railcar is clamped therebetween. The clamping frame is rotated about the axis of rotation into the end position, wherein the railcar is emptied. Subsequently, the tilting frame is rotated counter to the tilting direction into the starting position. In the unloaded state, the weight of the railcar is lower, and so the railcar spring subjects the bracket to a force and brings about tensions within the tilting apparatus, in particular in the locking device.

The hydraulic cylinder attached to the bracket allows compensation of the forces applied to the bracket via the railcar spring, and so tensions within the tilting device after the railcar has been emptied and during rotation counter to the tilting direction into the starting position are reliably avoided. By way of the hydraulic cylinder, the railcar spring forces that occur on account of the difference in weight of the railcar before and after the tilting operation are compensated in a targeted manner, independently of the weight of the railcar contents. Wear or the risk of breakage of the locking device is minimized.

The arrangement of the hydraulic cylinder on the bracket allows easy installation of the hydraulic cylinder, which is configured to compensate the railcar force.

According to a first embodiment, the hydraulic cylinder is arranged between the bracket and the clamping arm. This allows compensation of the forces that act between the bracket and the clamping arm that are introduced into the bracket via the railcar springs. The hydraulic cylinder is preferably attached to the clamping arm by its one end and to the bracket by its other end.

According to a further embodiment, the bracket comprises a first bracket arm and a second bracket arm that is rotatable relative to the first bracket arm, wherein the hydraulic cylinder is arranged between the first bracket arm and the second bracket arm. This allows compensation of the railcar spring forces via a relative movement of the bracket arms with respect to one another.

According to a further embodiment, the hydraulic cylinder is attached to the bracket such that it subjects the bracket to a force in the direction of the platform in the tilted position of the tilting apparatus.

According to a further embodiment, a hydraulic accumulator is arranged, which is connected to the hydraulic cylinder. A hydraulic accumulator allows passive regulation of the hydraulic cylinder and realizes easy and cost-effective installation of the hydraulic cylinder in the tilting apparatus.

According to a further embodiment a valve, in particular a magnetic control valve, is arranged between the hydraulic cylinder and the accumulator. The magnetic control valve is preferably electrically controllable.

According to a further embodiment, the valve comprises an open position, in which hydraulic fluid can flow from the hydraulic cylinder into the accumulator, and a closed position, in which a nonreturn valve prevents hydraulic fluid from flowing from the hydraulic cylinder into the accumulator. This allows easy regulation of the pressure in the hydraulic cylinder.

According to a further embodiment, the railcar comprises a truck and a railcar spring, wherein the hydraulic cylinder is arranged such that it counteracts the railcar spring. This allows optimal compensation of the forces applied to the tilting apparatus by the railcar spring.

Furthermore, the invention comprises a method for operating an above-described tilting apparatus, wherein the tilting apparatus comprises is a hydraulic accumulator which is connected to the hydraulic cylinder. The method comprising the steps of:

a) rotating the tilting frame in the tilting direction about the axis of rotation D, b) activating the locking device such that a relative movement between the tilting frame and the clamping arm is prevented, c) rotating the tilting frame in the tilting direction through an angle of about 130°-180° about the axis of rotation D, d) rotating the tilting frame counter to the tilting direction about the axis of rotation D, e) causing hydraulic fluid to flow from the hydraulic cylinder into the accumulator, f) releasing the locking device so as to allow a relative movement between the tilting frame and the clamping arm.

Step e) allows pressure compensation of the force of the railcar spring that additionally acts on the hydraulic cylinder on account of the difference in weight of the railcar, wherein tension in the locked locking device is prevented.

According to a further embodiment, the tilting apparatus comprises a valve which comprises an open position, in which hydraulic fluid can flow from the hydraulic cylinder into the accumulator, and a closed position, in which a nonreturn valve prevents hydraulic fluid from flowing from the hydraulic cylinder into the accumulator, and wherein step e) comprises moving the valve into the open position. As a result, a flow of hydraulic fluid from the hydraulic cylinder to the accumulator and thus pressure compensation between the hydraulic cylinder and the accumulator is allowed.

According to a further embodiment, between steps e) and f), the valve is moved into the closed position. As a result, a constant pressure is achieved in the hydraulic cylinder before the locking device is opened.

The above-described tilting apparatus and the method for operating a tilting apparatus allow pressure compensation within the tilting apparatus during the tilting operation, with the result that tensions in the tilting apparatus and in particular in the locking device are reliably avoided.

FIG. 1 shows a tilting apparatus 10 in which a railcar 22 is located. The tilting apparatus 10 comprises a tilting frame 12 which is configured in an approximately semicircular manner. The tilting frame 12 comprises a drive ring with a toothing which extends over the semicircularly configured range and interacts with a drive device 26 arranged on the ground. Furthermore, the tilting apparatus 10 comprises a clamping arm 14 which is connected to the tilting frame 12 so as to be rotatable about an axis of rotation D. The axis of rotation D is arranged approximately at the circle center of the semicircular tilting frame 12. The clamping arm 14 comprises a first region that extends approximately vertically in the starting position illustrated in FIG. 1 and comprises a substantially rectangular cross section, wherein the axis of rotation D extends approximately through the center of this region. The upper end of the first region is adjoined by a second region which extends at approximately 45° to the first region and comprises a substantially rectangular cross section. The clamping arm 14 furthermore extends in the direction of the axis of rotation D and so it exhibits for example two railcar lengths. Attached to the lower end of the first region of the clamping arm 14 is a counterweight 18 which comprises a substantially rectangular cross section and extends approximately at an angle of 45° to the first region of the clamping arm 14.

The tilting apparatus 10 furthermore comprises a platform 16 for receiving at least one railcar. The platform is connected to the tilting frame 12 so as to rotate therewith and comprises a surface which extends horizontally in the starting position in FIG. 1 and to which two rails 28 for guiding a railcar 22 are attached. Furthermore, the tilting apparatus 10 comprises a supporting wall 20 which extends in the direction of the axis of rotation D and is arranged on the inner side of the tilting frame 12, at least one railcar 22 lying against said supporting wall 20 in a tilted position as per FIGS. 2 and 3.

Arranged on the platform 16 is a railcar 22 to which a truck 30 that is positioned on the rails 28 and has two schematically illustrated railcar springs 32 is attached, said railcar springs 32 supporting the railcar 22. The railcar is loaded for example with bulk material.

A bracket 34 is attached to the outer end region of the second region of the clamping arm 14, above the railcar 22, said bracket 34 extending beyond the second region of the clamping arm 14. The bracket 34 comprises a first bracket arm 36 and a second bracket arm 40 which are attached to the underside of the second region of the clamping arm 14 in a rotatable manner via a holder. The first bracket arm 36 is supported on the underside of the second region of the clamping arm 14 by its inner end and comprises, at its outer end, a bearing region 38 which extends in the direction of the second region of the clamping arm 14. The second bracket arm 40 likewise comprises a bearing region 38 and is connected to the first bracket arm 36 in a rotatable manner via the holder.

A hydraulic cylinder 42 is arranged between the first bracket arm 36 and the second bracket arm 40 such that it spaces the first and the second bracket apart from one another.

The tilting apparatus 10 furthermore comprises a locking device 25 which is attached for example to the counterweight 18 and prevents a relative movement of the tilting frame with respect to the clamping arm 14. Such a lock can be for example a bolt or a latching connection which is able to be locked or released for example automatically as soon as a particular rotation angle of the tilting frame 12 with respect to the clamping arm 14 is achieved. The lock can furthermore be configured such that it prevents a relative rotation of the clamping frame with respect to the clamping arm only in one direction, such that for example a rotation counter to the clamping direction is prevented.

Figure 2:
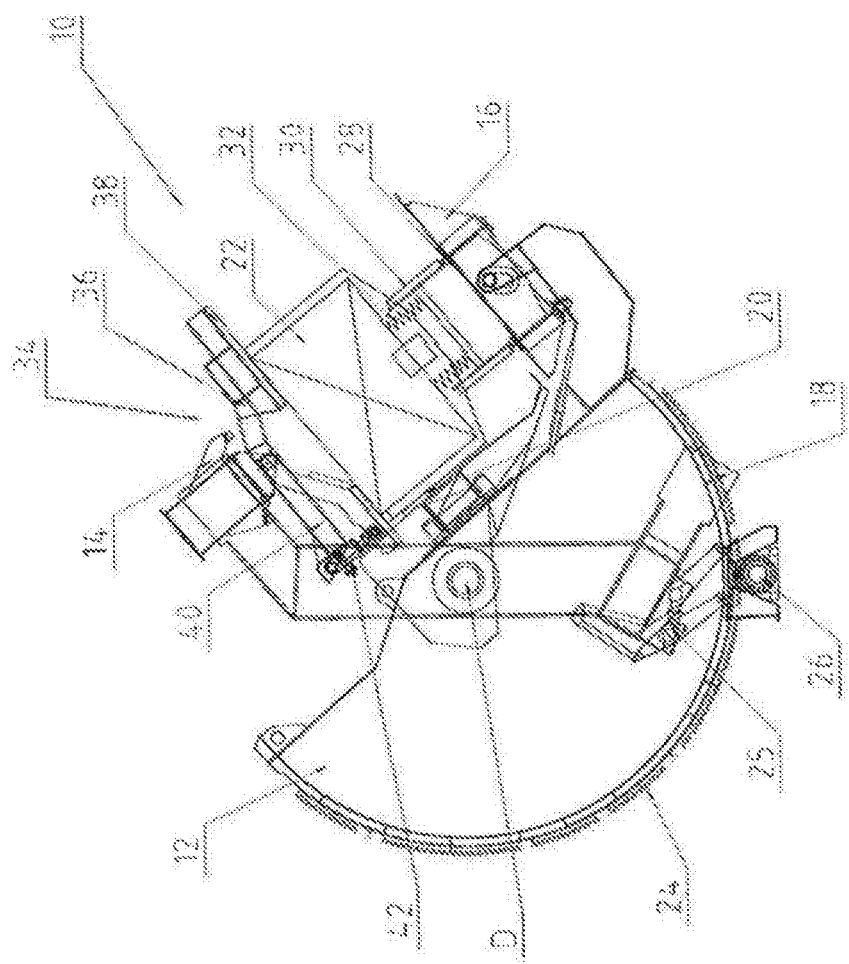
FIG. 2 is a schematic view of a tilting apparatus having a railcar according to the example of FIG. 1 in a tilted position.

FIG. 2 shows a tilting apparatus 10 having a railcar 22 as per FIG. 1, wherein the tilting apparatus, in contrast to FIG. 1, is in a tilted position in which the tilting frame 12 has been rotated through an about the axis of rotation D relative to the clamping arm 12. On account of the counterweight 18 attached to the lower region of the clamping arm 14, the clamping arm 14 is oriented vertically.

The platform 16 attached to the tilting frame 12 so as to rotate therewith has been rotated about the axis of rotation D with the tilting frame 12, such that the surface of the platform 16, on which the railcar 22 is arranged, extends at an angle to the horizontal and the railcar lies against the supporting wall 20 with its side wall facing the tilting apparatus 10.

As a result of the rotary movement of the tilting frame 12 relative to the clamping arm 14, the spacing between the bracket 34 attached to the clamping arm 14 and the platform 16 attached to the tilting frame 12 is reduced, such that, in the tilted position illustrated in FIG. 2, the bearing regions 38 of the first and of the second bracket arm 36, 40 lie against the upper edges of the side walls of the railcar 22. In the tilted position, the railcar is clamped between the bracket 34 and the platform 16, such that the railcar springs 32 are subjected at least to a force in the direction of the platform 16.

The tilted position illustrated in FIG. 2 shows the position in which the locking device 25 latches and prevents a further relative rotation of the tilting frame 12 relative to the clamping arm 14.

Figure 3:
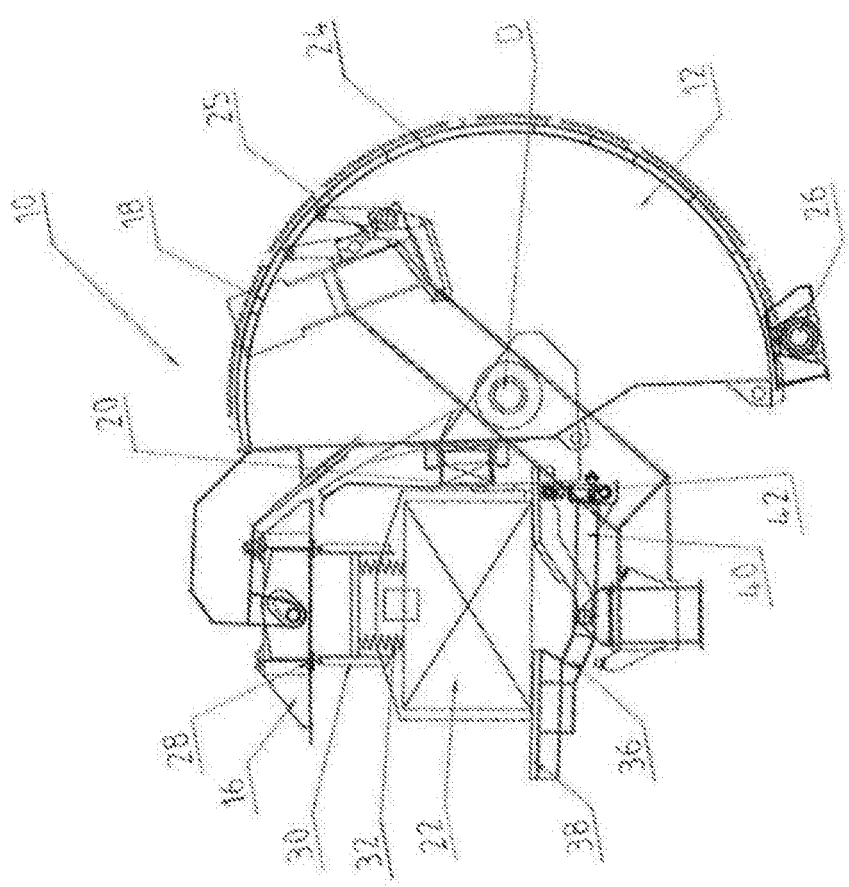
FIG. 3 is a schematic view of a tilting apparatus having a railcar according to the example of FIG. 1 in a further tilted position.

FIG. 3 shows the tilting apparatus 10 as per FIGS. 1 and 2 in a further tilted position in which the tilting frame 12 has been rotated through a maximum rotation angle about the axis of rotation D, such that the railcar 22 is emptied. In this position, the maximum force acts on the clamping arm 14 via the bracket 34. FIGS. 1 to 3 represent a rotary movement of the tilting frame 12 in the tilting direction.

In order to carry out a tilting operation, the tilting frame 12 is rotated in the tilting direction from the starting position illustrated in FIG. 1 until the end position illustrated in FIG. 3 is reached. Between the starting position in FIG. 1 and the end position in FIG. 3, the tilted position illustrated in FIG. 2 is reached, in which the locking device 25 locks such that a relative movement between the tilting frame 12 and the clamping arm 14 is prevented. Once the end position as per FIG. 3 has been reached, the tilting frame 12 is rotated counter to the tilting direction and so the tilted position illustrated in FIG. 2 is reached, in which the clamping arm is oriented substantially vertically. In this tilted position, in the event of the tilting frame 12 being rotated counter to the tilting direction, the lock between the tilting frame 12 and the clamping arm 14 is released, and so a relative movement therebetween is possible. Subsequently, the tilting frame 12 is rotated into the starting position as per FIG. 1, such that the emptied railcar can leave the tilting apparatus 10.

Figure 4:
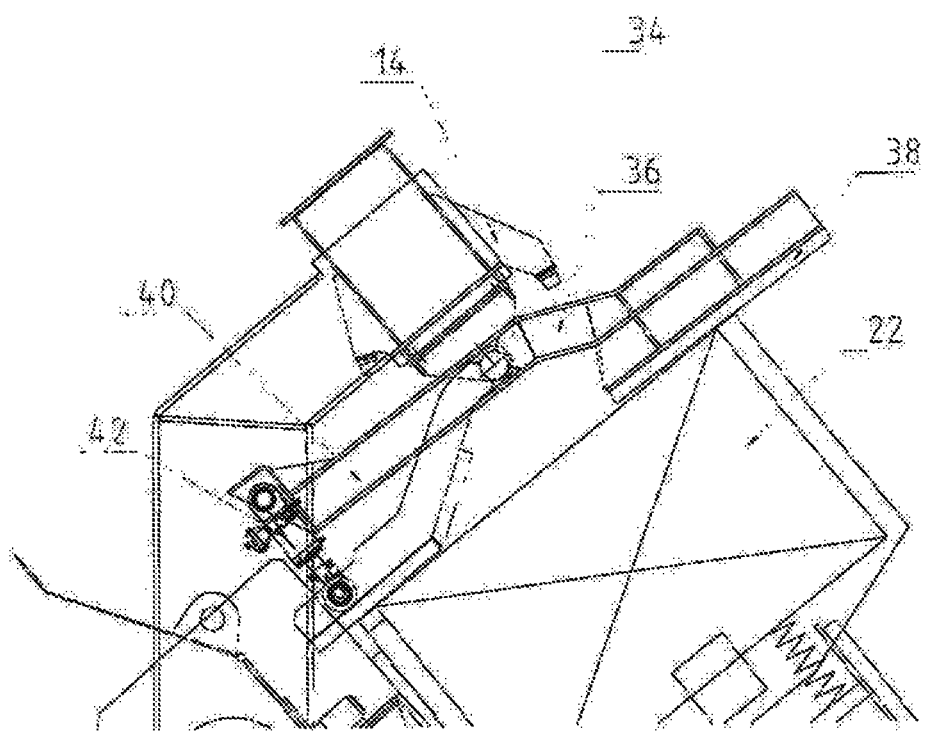
FIG. 4 is a detail view of the tilting apparatus of FIG. 2.

FIG. 4 shows an enlarged detail of the tilting apparatus 10 in the tilted position as per FIG. 2. In particular, FIG. 4 shows the bracket 34, wherein the hydraulic cylinder 42 is attached by way of its first, upper end to that region of the first bracket arm 36 that is supported on the clamping arm 14 and is attached by way of its second, lower end to the bearing region 38 of the second bracket arm 40. It is likewise conceivable to attach the hydraulic cylinder for example between the second bracket arm 40 and the clamping arm 14.

In the starting position illustrated in FIG. 1, the railcar 22 is filled for example with bulk material, wherein the weight force of the bulk material in the railcar 22 subjects the railcar springs 32 to a force. Once the railcar 22 has been emptied, the railcar is lighter by the weight of the bulk material and the force acting on the railcar springs 32 is lower, and so the railcar springs 32 subject the bracket 34 to a force. This force, which results from the difference in the railcar weight before and after emptying, is introduced into the clamping arm 14 via the bracket 34 and causes tension in the locking device 25 between the clamping arm 14 and the tilting frame 12 such that it is difficult to release the lock. The arrangement of the hydraulic cylinder 42 prevents such tension in the locking device 25, as is described in the following text with reference to FIG. 5.

Figure 5:
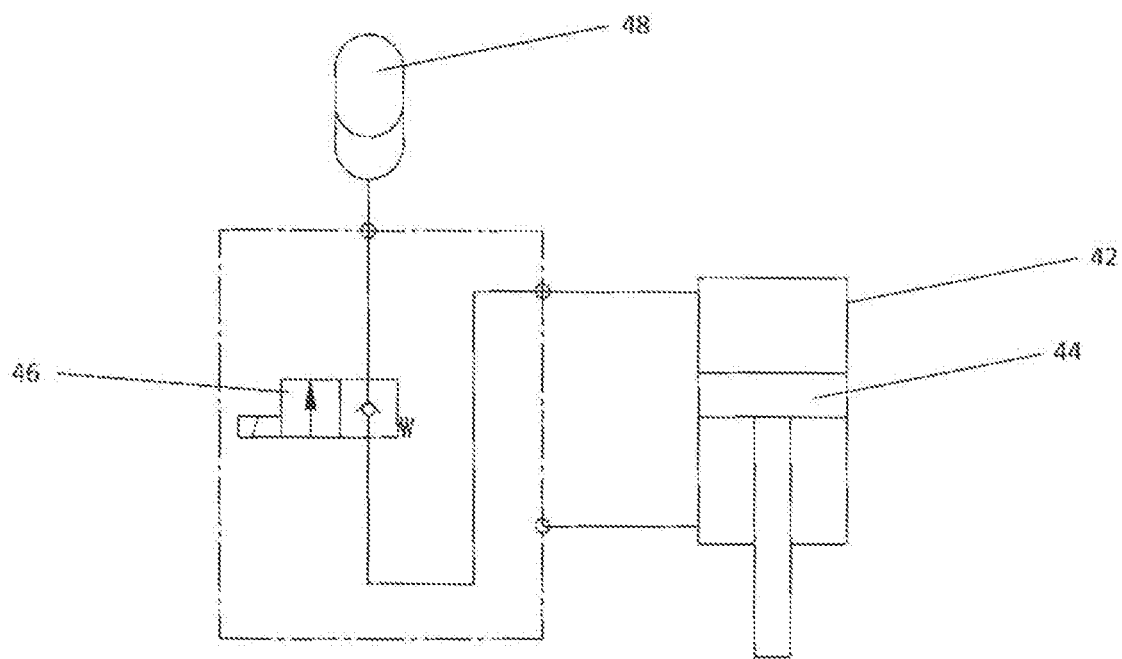
FIG. 5 is a schematic view of an example hydraulic circuit of the hydraulic cylinder of FIGS. 1-4.

FIG. 5 shows a schematic illustration of a hydraulic circuit of the hydraulic cylinder 42 in FIGS. 1-4. Arranged in the hydraulic cylinder is a piston 44, which is located approximately at the center of the hydraulic cylinder in FIG. 5 and divides the hydraulic cylinder into two chambers. The hydraulic cylinder is connected to an accumulator 48 via a magnetic control valve 46, wherein the magnetic control valve is a two-way valve with a nonreturn valve which realizes a closed valve position, and a passage which realizes an open valve position. In the closed position, illustrated in FIG. 5, of the magnetic control valve 46, a hydraulic flow from the hydraulic cylinder to the accumulator is prevented via the nonreturn valve.

The position, shown in FIG. 5, of the magnetic control valve 46 corresponds to the position in the tilted positions in FIGS. 1 to 3, in which the tilting operation from the starting position in FIG. 1 to the end position in FIG. 3 is illustrated.

During the tilting operation, when the tilting frame 12 is rotated in the tilting direction, the magnetic control valve 46 is in the position illustrated in FIG. 5. During the rotation of the tilting frame 12 counter to the tilting direction, the magnetic control valve 46 switches from the closed position into the open position when a particular rotation angle of the tilting frame 12 is reached. The rotation angle at which the magnetic control valve releases the hydraulic flow between the hydraulic cylinder 42 and the accumulator 48 comprises a range from about 40° to 90°, in particular about 50° to 70°. Preferably, the magnetic control valve 46 is moved from the closed position into the open position before the lock is released.

In the open position of the magnetic control valve, hydraulic fluid flows from the hydraulic cylinder 42 to the accumulator 48, wherein the piston 44 moves into the hydraulic cylinder 42 on account of the force of the railcar springs 32 that acts on the piston 44, until it has reached the end of the hydraulic cylinder 42 or compensation of the force that results from the difference in the railcar weight before and after emptying has been achieved. The opening of the magnetic control valve 46 brings about at least partial compensation of the forces within the tilting apparatus 10, wherein tension in the locking device 25 is avoided.

During the further tilting operation counter to the tilting direction, the magnetic control valve 46 is moved back into the closed position, wherein the piston 44 remains in the retracted position on account of the resulting forces acting thereon. The magnetic control valve 46 is moved back into the closed position in particular before the locking device 25 is unlocked. When the tilted position illustrated in FIG. 2 is reached, the locking device 25 is opened and when the position illustrated in FIG. 2 is passed, the bracket 34 is lifted off the railcar 22. In the closed position of the magnetic control valve 46, a nonreturn valve is arranged between the hydraulic cylinder 42 and the accumulator 48 such that a hydraulic flow is possible from the accumulator 48 to the hydraulic cylinder 42. Before the starting position illustrated in FIG. 1 is reached, the position, illustrated in FIG. 5, of the piston 44 in the hydraulic cylinder is reached again.

The above-described arrangement allows compensation of the forces that arise on account of the emptying of the railcar, wherein tensions within the tilting apparatus are reliably avoided and high wear or breakage of the locking device 25 is prevented.

LIST OF REFERENCE SIGNS

10 Tilting apparatus
12 Tilting frame
14 Clamping arm
16 Platform
18 Counterweight
20 Supporting wall
22 Railcar
24 Drive ring
25 Locking device
26 Drive device
28 Rails
30 Truck
32 Railcar spring
34 Bracket
36 First bracket arm
38 Bearing region
40 Second bracket arm
42 Hydraulic cylinder
44 Piston
46 Magnetic control valve
48 Accumulator

What is claimed is:

1. A tilting apparatus for emptying materials out of railcars, the tilting apparatus comprising:
    a tilting frame that is rotatable about an axis of rotation and is connected to a platform that can receive at least one railcar;
    a clamping arm that is attached to the tilting frame in a rotatable manner;
    a locking device for preventing relative movement between the tilting frame and the clamping arm;
    a bracket that is attached to the clamping arm such that in a tilted position of the tilting apparatus in which the tilting frame is rotated about the axis of rotation the bracket is configured to lie at least partially against an upper edge of at least one side wall of the at least one railcar; and
    a hydraulic cylinder that is attached to the bracket and at least partially compensates for tensions in the tilting apparatus that arise during a tilting operation as a result of material being emptied, and configured to compensate for the forces acting on the bracket by railcar springs, wherein the hydraulic cylinder is disposed between the bracket and the clamping arm.

2. The tilting apparatus of claim 1 further comprising the platform.

3. The tilting apparatus of claim 1 wherein the hydraulic cylinder at least partially compensates for tensions in the locking device that arise during the tilting operation.

4. The tilting apparatus of claim 1 wherein the hydraulic cylinder is attached to the bracket such that the hydraulic cylinder subjects the bracket to a force in a direction of the platform in the tilted position of the tilting apparatus.

5. The tilting apparatus of claim 1 further comprising a hydraulic accumulator that is connected to the hydraulic cylinder.

6. The tilting apparatus of claim 5 further comprising a valve disposed between the hydraulic cylinder and the hydraulic accumulator.

7. The tilting apparatus of claim 6 wherein the valve has
an open position in which hydraulic fluid can flow from the hydraulic cylinder into the hydraulic accumulator, and
a closed position in which a nonreturn valve prevents hydraulic fluid from flowing from the hydraulic cylinder into the hydraulic accumulator.

8. The tilting apparatus of claim 1 wherein the hydraulic cylinder is configured to counteract a railcar spring of the at least one railcar, which comprises a truck and the railcar spring.

9. A method for operating a tilting apparatus comprising a tilting frame that is rotatable about an axis of rotation and is connected to a platform that can receive at least one railcar, a clamping arm that is attached to the tilting frame in a rotatable manner, a locking device for preventing relative movement between the tilting frame and the clamping arm, a bracket that is attached to the clamping arm such that in a tilted position of the tilting apparatus in which the tilting frame is rotated about the axis of rotation the bracket is configured to lie at least partially against an upper edge of at least one side wall of the at least one railcar, a hydraulic cylinder that is attached to the bracket and at least partially compensates for tensions in the tilting apparatus that arise during a tilting operation, and a hydraulic accumulator that is connected to the hydraulic cylinder, the method comprising:
rotating the tilting frame in a tilting direction about the axis of rotation;
activating the locking device to prevent relative movement between the tilting frame and the clamping arm;
rotating the tilting frame in the tilting direction through an angle of about 130°-180° about the axis of rotation;
rotating the tilting frame counter to the tilting direction about the axis of rotation;
causing hydraulic fluid to flow from the hydraulic cylinder into the hydraulic accumulator; and
releasing the locking device to permit relative movement between the tilting frame and the clamping arm.

10. The method for operating the tilting apparatus of claim 9 wherein the tilting apparatus further comprises a valve that has
an open position in which hydraulic fluid can flow from the hydraulic cylinder into the hydraulic accumulator, and
a closed position in which a nonreturn valve prevents hydraulic fluid from flowing from the hydraulic cylinder into the hydraulic accumulator,
wherein causing hydraulic fluid to flow from the hydraulic cylinder into the hydraulic accumulator comprises moving the valve into the open position.

11. The method for operating the tilting apparatus of claim 10 further comprising moving the valve into the closed position after causing hydraulic fluid to flow from the hydraulic cylinder into the hydraulic accumulator and before releasing the locking device to permit relative movement between the tilting frame and the clamping arm.

12. The method for operating the tilting apparatus of claim 10 wherein the valve is in the closed position during the rotating steps and the activating step.

13. A tilting apparatus for emptying materials out of railcars, the tilting apparatus comprising:
a tilting frame that is rotatable about an axis of rotation and is connected to a platform that can receive at least one railcar;
a clamping arm that is attached to the tilting frame in a rotatable manner;
a locking device for preventing relative movement between the tilting frame and the clamping arm;
a bracket that is attached to the clamping arm such that in a tilted position of the tilting apparatus in which the tilting frame is rotated about the axis of rotation the bracket is configured to lie at least partially against an upper edge of at least one side wall of the at least one railcar; and
a hydraulic cylinder that is attached to the bracket and at least partially compensates for tensions in the tilting apparatus that arise during a tilting operation,
wherein the bracket comprises a first bracket arm and a second bracket arm that is rotatable relative to the first bracket arm, wherein the hydraulic cylinder is disposed between the first bracket arm and the second bracket arm.

14. A tilting apparatus for emptying materials out of railcars, the tilting apparatus comprising:
a tilting frame that is rotatable about an axis of rotation and is connected to a platform that can receive at least one railcar;
a clamping arm that is attached to the tilting frame in a rotatable manner;
a locking device for preventing relative movement between the tilting frame and the clamping arm;
a bracket that is attached to the clamping arm such that in a tilted position of the tilting apparatus in which the tilting frame is rotated about the axis of rotation the bracket is configured to lie at least partially against an upper edge of at least one side wall of the at least one railcar;
a hydraulic cylinder that is attached to the bracket and at least partially compensates for tensions in the tilting apparatus that arise during a tilting operation, and
a hydraulic accumulator that is connected to the hydraulic cylinder.

* * * * *